United States Patent [19]

Bertrand et al.

[11] 4,176,810

[45] Dec. 4, 1979

[54] LOCK SENSITIVITY ADJUSTOR

[75] Inventors: Jacques A. Bertrand, Paris; Robert A. Marechal, Bezons, both of France

[73] Assignee: Klippan France, S.A., Paris, France

[21] Appl. No.: 916,663

[22] Filed: Jun. 19, 1978

Related U.S. Application Data

[63] Continuation of Ser. No. 673,331, Apr. 5, 1976, abandoned.

[30] Foreign Application Priority Data

Apr. 7, 1975 [FR] France .................................. 75 10783

[51] Int. Cl.² ........................ A62B 35/02; B65H 75/48
[52] U.S. Cl. ................................ 242/107.4 B; 280/806
[58] Field of Search .............. 242/107.4 RE; 297/388; 280/744–747; 180/82 C

[56] References Cited

U.S. PATENT DOCUMENTS

| | | | |
|---|---|---|---|
| 3,711,037 | 1/1973 | Jakob | 242/107.4 B |
| 3,858,824 | 1/1975 | Stephenson | 242/107.4 B X |
| 3,980,247 | 9/1976 | Kuszyncki et al. | 242/107.4 B X |

FOREIGN PATENT DOCUMENTS 351367 11/1972 Sweden.
1069402 5/1967 United Kingdom.

Primary Examiner—Harvey C. Hornsby
Assistant Examiner—John M. Jillions
Attorney, Agent, or Firm—Roger H. Criss; Patrick L. Henry

[57] ABSTRACT

A vehicle safety belt retractor is provided with means for varying sensitivity of the locking mechanism. Force applied via a return component to a mobile support associated with the locking mechanism varies blocking sensitivity in proportion to the length of belt protracted.

5 Claims, 4 Drawing Figures

LOCK SENSITIVITY ADJUSTOR

This is a continuation, of application Ser. No. 673,331, filed Apr. 5, 1976, now abandoned.

BACKGROUND OF THE INVENTION

1. Field of the Invention

The present invention relates to a blocking device with varying sensitivity for a strap-winder.

2. Description of the Prior Art

The automatic strap-winders and their special application to car safety belts are now well known. Such devices allow normal movements by the user but automatically lock in cases of impact to prevent protraction of the strap, the locking being effective by means of a device sensitive to the acceleration of the strap, the vehicle on both.

The present invention concerns an improvement of the devices sensitive to the acceleration of the strap, and more particularly, of the devices admitting of an element of inertia set on a mobile support equipped with return mechanism laid out so it will block the couple transmitted to the element of inertia by the protraction of the strap and acting on the mobile support in order to keep it out of its normal position of equilibrium and thus block the winder's reel in the unfolding direction. A device of this type is described in particular in the U.S. Pat. No. 3,858,824. Such a device usually includes an inertia wheel joined to the movement of the reel's axle by means of a cog-wheel and held by a support that turns on the reel's axle. The return of the support is normally insured by a spring that prevents the mobile support from moving when the strap is displaced in the protracting direction. When the protraction of the strap above is not enough to allow a very quick fastening of the strap and at the same time maintain enough sensitivity within the framework of the legal standards set in various countries.

SUMMARY OF THE INVENTION

Therefore, one aim of the present invention is to build a device which, while allowing to achieve a weak sensivity of the blocking device when the strap is being fastened by the user, will allow at the same time to obtain enough sensitivity when the belt is fastened.

In order to achieve that goal, one anticipates according to the present invention a device allowing to act on the return spring of the support of the rotative element of inertia in order to achieve a variation of the tension exerted by the spring, the tension being strong when the belt is still unfastened, and weaker when the belt is in normal operating position.

According to a more particular application of the present invention, one anticipates the use of a cam whose movement is connected with the movement of the reel's axle by means of a set of cog-wheels and whose position determines the tractive force of the return spring on the support of the rotative element of inertia.

According to another particular concept, one anticipates to attach the end of the return spring opposite to the one that is connected to the support of the rotative element of inertia by means of the mobile plunging rod of an induction-coil that is excited when the belt is unfastened and de-excited when the belt is fastened.

According to another particular concept, one anticipates to join the end of the return spring opposite to that attached to the support of the rotative element of inertia to an arm whose position is controlled by the introduction into or the withdrawal of the belt from the buckle by means of an hydraulic device built in such a way that should a leak of transmission fluid occur, the return spring will be automatically in the position at which the strap-blocking device has a maximum sensitivity.

BRIEF DESCRIPTION OF THE DRAWINGS

Other characteristics and advantages of the present invention will be mentioned in the following description of the drawings, in which.

DESCRIPTION OF THE PREFERRED EMBODIMENTS

Figure 1:
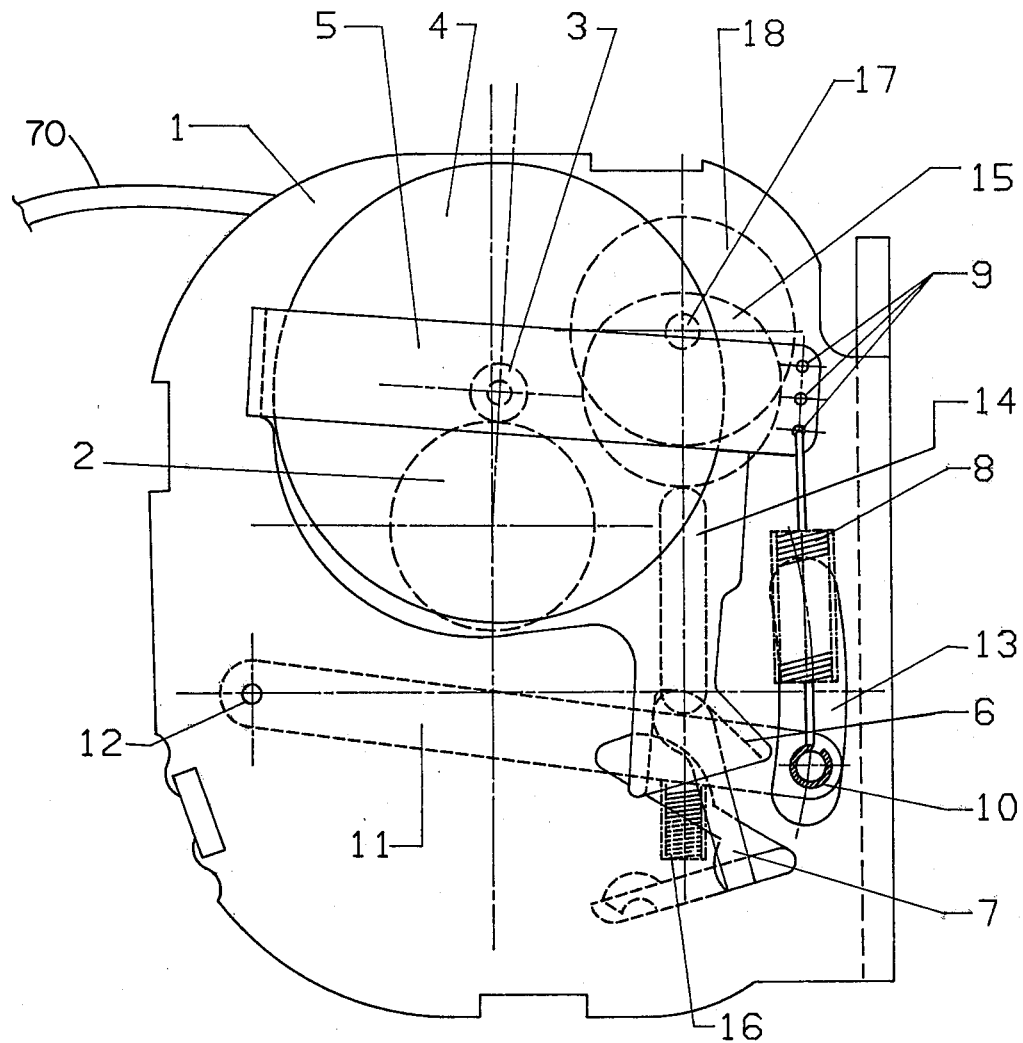
FIG. 1 is a side view of a winder equipped with a blocking device sensitive to the acceleration of the strap and a device for automatic variation of sensitivity according to the present invention.

Referring to FIG. 1, the device sensitive to the acceleration of the strap 70 according to one present invention includes a casing 1 crossed by an axle bearing a pinion 2 connected to the reel holding the strap. The pinion 2 meshes with a pinion 3 held by the rotative element of inertia 4 which, in turn, is held by a mobile support 5 that can turn on the axle of pinion 2. The mobile support 5 has a bracket 6 co-operating with a pawl 7 intended, to block the strap's reel (not shown) in a conventional manner.

In order to avoid the blocking of the strap 70 even at a very slow unfolding rate, the mobile support is normally brought back clockwise by a spring 8 of which one end is attached to the holes 9 and the other end normally attached to the casing. The presence of many holes 9 on the mobile support is known and permits adjusting the operating sensitivity of the device in order to adapt it to the standards in force in various countries where the device is used. It should be noted that the possibility of adjustment is then manual, and requires the disassembling of the winder's casing and is intended to vary the nominal sensitivity of the blocking device. On the contrary, the device according to the present invention permits an automatic variation of the sensitivity between a weak-sensitivity position and the nominal-sensitivity position such as the one chosen when the device is assembled.

According to the present invention, the hook normally attached to the casing of spring 8 is replaced with a movable hooking component 10.

Figure 2:
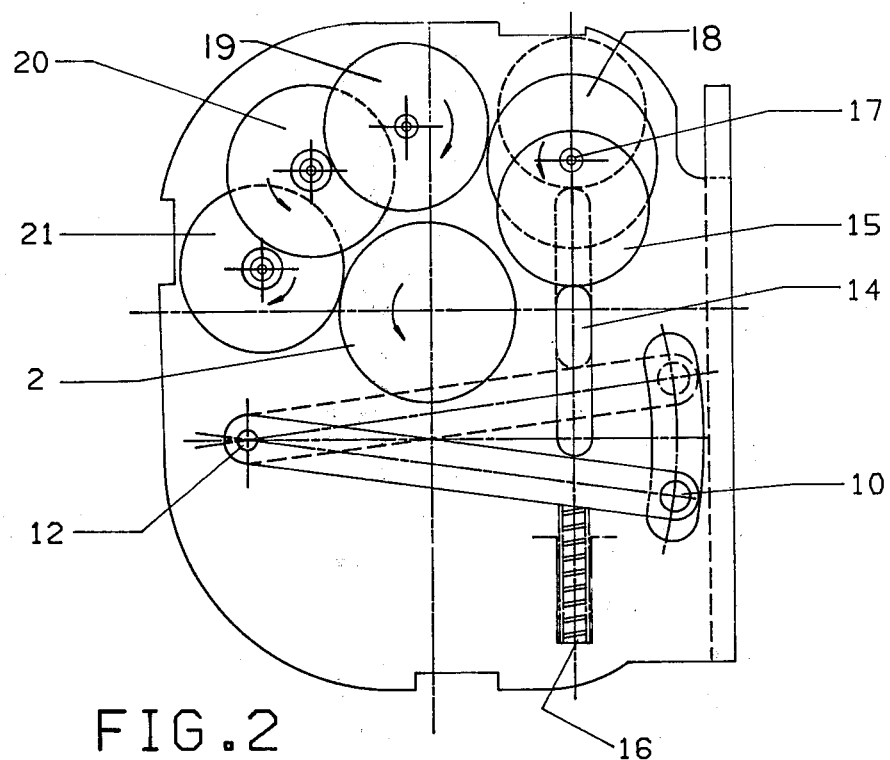
FIG. 2 is a detailed schematic view of the device for automatic variation of sensitivity according to the present invention.

In the case of the embodiment shown in FIGS. 1 and 2, the hook 10 is supported by a bracket 11 than can turn on an axle 12 that is attached to the casing. Should the supporting bracket 11 move in relation to the casing's compartment, a slot 13 is provided that allows the movement of the hooking component 10. The device for automatic variation of sensitivity of the present invention also has a pushing shaft 14 held on one end by the supporting bracket 11 and on the other end by a cam 15 co-operating with the strap 70 as explained later on (for reasons of clarity, the cam's driving shaft is not shown on FIG. 1). The device can also have a spring 16 attached to the case by one of its two extremities and leaning by the other extremity on the support's bracket 11 in such a manner as to fasten it to the pushing shaft 14. However such a spring is not indispensable since the spring 8, in principle, will have a tendency to bring back the support's bracket 11 towards the cam 15. It should also be noted that the pushing rod is not indispensable; in fact, one can anticipate for the cam a position such that the latter acts directly on the side of the turning arm 11.

In referring to FIG. 2 that shows a particular concept of the device for variation of sensitivity according to the present invention, the cam 15 is supported by an axle 17 holding a pinion 18 which moves with the strap 70 by means of a set of cog-wheels 19, 20, 21, the latter meshing with the pinion 2 or any other pinion directly set on the reel's axle.

The device operates as follows: When the strap 70 is completely wound on the reel, the cam 15 and the hooking component 10 are in the position shown in solid lines in FIG. 2, e.g. the pushing rod 14 is set on the largest side of the cam 15 and, therefore, pushes back the hooking component, 10 towards a position such that the spring 8 is therefore stretched. The tension of spring 8 exerts an important force against the movement of the mobile support component 5. The blocking device is moderately sensitive and the user can quickly pull the belt without it being blocked. Gradually, as the strap 70 unfolds, the cam is driven rotatively by means of the set of cog-wheels and for a length of strap 70 corresponding to the average length of strap 70 unfolded for the purpose of fastening the belt, the cam reaches the position opposite the initial position shown in broken lines in FIG. 2. Under the acting of the spring 16, the bracket 11 and the hooking component 10 also take the position shown in broken lines, and it is obvious that the spring 8 is then stretched with regard to the initial position. The sensitivity of the device reaches then the nominal sensitivity required according to the safety standards in force in the country under consideration and the belt is blocked instantly in case of fast unfolding. The shape of the cam will of course be such that the sensitivity of the device remains the same in an area of unfolded length corresponding to the area of waistline of the persons who may use the safety belt. It should also be noted that the number of cog-wheels is not limiting and may be varied.

Figure 3:
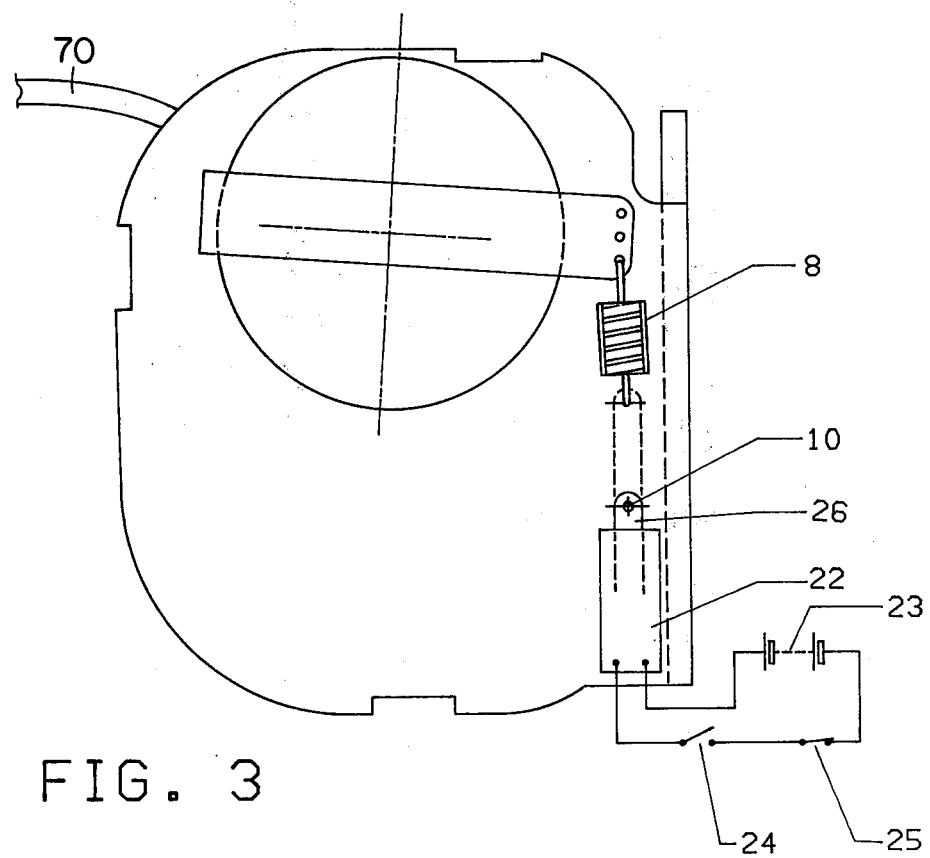
FIG. 3 is a variant of the device for automatic variation of sensitivity according to the present invention.

Referring now to FIG. 3 where a variant of the concept is shown. According to this variant, the hooking component 10 is set on the moyen plunger 26 of an electromagnetic coil (induction-coil) 22 that can be fed by a source 23 by means of a circuit including two circuit-breakers 24 and 25. When the coil is de-excited, the moyen plunging rod plunger is pulled by the spring 8 and blocking device sensitive to the strap's action processes the normal sensitivity required by the safety standards. When the coil 22 is excited, the plunging rod is pulled by the coil according to the position shown by broken lines, and the spring exerts on the mobile support component an important force allowing the quick fastening of the strap 70 without untimely blocking of the latter.

For the control of the excitation and of the de-excitation of the coil, one can anticipate that the circuit breaker 24 is a switch normally open whose operation is concomitant to that of the car's starter and the circuit breaker 25 is a switch normally closed set in the buckle of the safety belt so that it be opened by the introduction of the bolt in to the buckle. Then the belt operates as follows: When the user starts the car's engine, he closes the circuit breaker 24 and the coil 22 is excited, the plunging rod 26 is then in the position shown by a solid line in FIG. 3 and the spring 8 is stretched; then the user is able to pull the belt even rapidly and insert the bolt into the buckle of the safety belt (not shown). The insertion of the bolt elicits the opening of the circuit breaker 25 and consequently the de-excitation of the coil. The rod takes then the position shown by broken lines in FIG. 3 when the belt is in its place; consequently the blocking device possesses the sensitivity required by the standards in force.

Figure 4:
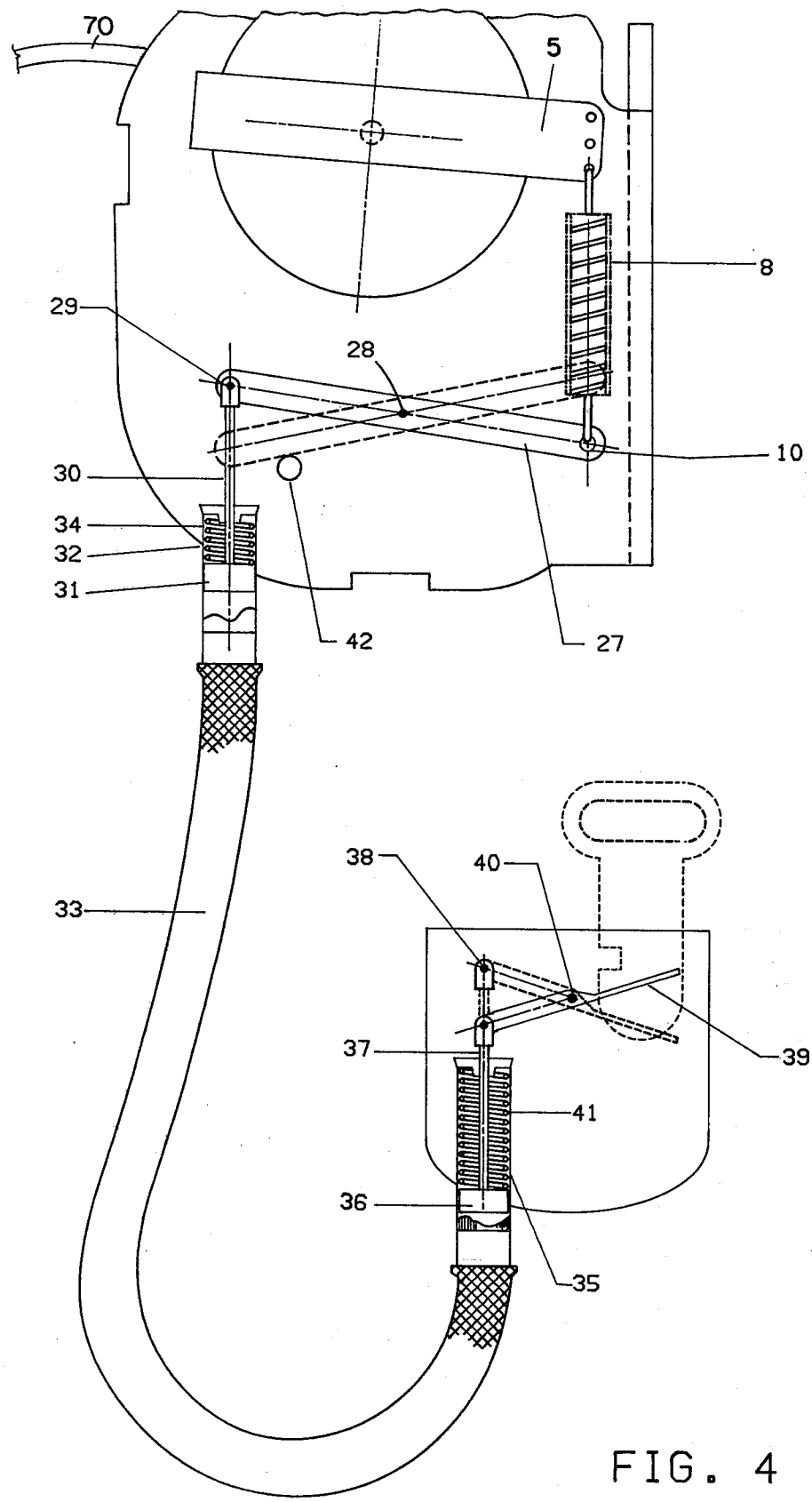
FIG. 4 is another variant of the device for automatic variation of sensitivity according to the present invention.

FIG. 4 shows another variant of the device according to the present invention. According to that variant, the hooking component 10 is set on a bracket 27 that can turn on an axle 28 attached to the casing and connected in 29 with a piston rod 30 linked to a piston 31. The piston 31 is held in a sheath 32 in the shape of a cyliner, and attached by one of its extremities to the winder's casing or any fixed point in relation to the winder. The cylinder 32 is connected to a sheath 33 containing an incompressible fluid. One can also anticipate a returning spring 34 leaning on one side on the cylinder's inner compartment 32 and on the other side on the piston 31 in such a manner as to attract the bracket 27 to a position where the spring 8 is subjected to a tension corresponding to the nominal sensitivity of the strap's blocking device.

Besides, the sheath 33 is connected to a fixed cylinder 35 in relation to the buckle of the safety belt, for instance attached to the latter's casing. A piston 36 is placed into the cylinder 35 and bears a piston rod 37 articulated in 38 with a control bracket 39 that can turn on an axle 40. The piston 36 is normally held in position far from the closed end of the cylinder 35 by means of a spring 41 leaning on one side on the closed end of the cylinder and on the other side on the piston 36, and which exerts on the latter a force greater than the opposite force exerted by the springs 34 and 8.

The device works as follows: As long as the belt is not buckled, the spring 41 pushes back the piston 36 whose position is transmitted to the piston 31 by means of the fluid kept in the sheath 33 (which can be soft or hard provided that it suitably transmit the pressure). Then the piston 31 itself pushes back the spring 34 and acts on the bracket's end 27 in order to place the latter in the position shown in solid lines in FIG. 4. The bracket 27 is then in the position where the spring 8 is stretched the most, thus reducing the sensitivity of the blocking device and preventing any untimely blocking even for a rapid unfolding of the strap 70. When the bold is inserted into the safety belt's buckle, the bracket 39 is in the position shown by broken lines in FIG. 4 and acts by means of the rod 37 on the piston 36 in order to return the latter towards the far end of the cylinder 32 under the action of the return spring 34 and also of the spring 8. The bracket 27 takes the position shown by broken lines in such a manner that the spring 8 exerts on the mobile support 5 a force adjusted to the nominal sensitivity required.

It should be noted that, in fact, the position of the bracket 27 depends definitively on the position of the bracket 39; in order to obtain a greater accuracy as to the tension exerted by the spring 8, a prop 42 attached to the winder's casing determines the position of the bracket 27 when the strap's blocking device operates normally. It should be noted also that the spring 8 exerts a force that tends to push back the piston 31 from the far end of the cylinder 32 and that the return spring 34 is not absolutely indispensable for a satisfactory operation of the device according to the present invention. Finally it should be noted the sensitivity—varying device described is particularly safe: in fact, should a leak of the hydraulic fluid occur, the piston 31 does not have to cooperate with the piston 36 but rather is automatically brought back by the spring 8 (and the spring 34 if such a spring is provided) to the position at which the winder has its maximum sensitivity; in that case, the bracket 27 moves until it leans against the prop 42. It should be noted that the device according to the present invention does not in any way prevent the use in a parallel manner of a blocking device sensitive to the operation of the motor vehicle. Besides, such a device does not raise the problem of untimely blocking in case of quick fastening.

The present invention is not limited to the above mentioned examples; on the contrary, it is susceptible to variations and modifications that will be evident to the craftsman.

We claim:

1. In a belt retractor, said retractor including a belt receiving spool rotatably mounted on a frame, comprising:
    means for sensing acceleration of said spool in a belt protracting direction;
    a mobile support means connected to said frame and movable between a first and second position responsive to sensing of a predetermined acceleration of said spool by said sensing means;
    blocking means connected with said mobile support means and actuated by movement of said mobile support means from the first to the second position to block further protractive movement of said spool;
    spring means connected to said mobile support means for biasing said mobile support means to said first position;
    means for varying the force of the spring on the mobile support means whereby the sensitivity of the blocking means to acceleration of the spool can be varied;
    means for actuating said spring force varying means from a weak sensitivity position when the belt is being initially withdrawn to a high sensitivity position when the belt is protracted to a position of use.

2. Device according to claim 1, wherein the means for varying the spring force comprises a component connected to a mobile bracket whose position is controlled by means of a cam and wherein the cam's position is dependent on the length of belt unfolded.

3. Device according to claim 2, wherein the cam is connected to the spool via a set of demultiplicating cog wheels.

4. Device according to claim 2, wherein the cam is operatively connected to the spool so that when the belt is completely retracted the spring exerts a maximum force on the mobile support.

5. Device according to claim 1, wherein the means for varying the force of the spring is actuated in response to the presence or absence of a seat belt tongue in a seat belt buckle wherein the high sensitivity position exists when the buckle is buckled.

* * * * *